United States Patent
Samuel

(10) Patent No.: US 9,689,249 B2
(45) Date of Patent: Jun. 27, 2017

(54) AUTOMATING DOWNHOLE DRILLING USING WELLBORE PROFILE ENERGY AND SHAPE

(71) Applicant: Halliburton Energy Services, Inc., Houston, TX (US)

(72) Inventor: Robello Samuel, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 424 days.

(21) Appl. No.: 14/374,538

(22) PCT Filed: Aug. 30, 2013

(86) PCT No.: PCT/US2013/057498
§ 371 (c)(1),
(2) Date: Jul. 25, 2014

(87) PCT Pub. No.: WO2015/030790
PCT Pub. Date: Mar. 5, 2015

(65) Prior Publication Data
US 2015/0247397 A1    Sep. 3, 2015

(51) Int. Cl.
*G01M 1/38* (2006.01)
*E21B 44/00* (2006.01)
(Continued)

(52) U.S. Cl.
CPC .............. *E21B 44/005* (2013.01); *E21B 7/04* (2013.01); *E21B 44/04* (2013.01); *E21B 44/06* (2013.01); *E21B 47/024* (2013.01); *G05B 15/02* (2013.01)

(58) Field of Classification Search
CPC .................................................. E21B 44/005
(Continued)

(56) References Cited

U.S. PATENT DOCUMENTS 4,445,578 A * 5/1984 Millheim ................ E21B 44/00
175/45
4,690,212 A * 9/1987 Termohlen ........... H01R 13/523
166/65.1
(Continued)

FOREIGN PATENT DOCUMENTS

RU          2370620 C1   10/2009
RU          2424430 C2   7/2011
WO       2015030790 A1   3/2015

OTHER PUBLICATIONS

Willersrud, Anders, et al. "Fault diagnosis of downhole drilling incidents using adaptive observers and statistical change detection." Journal of Process Control 30 (2015): pp. 90-103.*
(Continued)

*Primary Examiner* — Satish Rampuria
(74) *Attorney, Agent, or Firm* — McDermott Will & Emery LLP

(57) ABSTRACT

Disclosed are systems and method for automating downhole drilling based on the profile and energy of the wellbore being drilled. One method includes advancing a bottom hole assembly (BHA) within a subterranean formation and thereby forming a wellbore along an actual wellbore path, the BHA including a controller module, one or more sensors, and a steering assembly, taking survey measurements with the sensors at two or more survey stations along the actual wellbore path, comparing the survey measurements with data corresponding to a planned wellbore path, determining a return path based on minimum energy of the actual wellbore path when the actual wellbore path has deviated from the planned wellbore path, and conveying a corrective command signal to the steering assembly in order to reorient a trajectory of the actual wellbore path such that it returns to the planned wellbore path.

18 Claims, 4 Drawing Sheets

(51) Int. Cl.
*E21B 7/04* (2006.01)
*E21B 44/04* (2006.01)
*E21B 44/06* (2006.01)
*E21B 47/024* (2006.01)
*G05B 15/02* (2006.01)

(58) Field of Classification Search
USPC .................................................. 700/275–306
See application file for complete search history.

(56) References Cited

U.S. PATENT DOCUMENTS

| | | | | |
|---|---|---|---|---|
| 4,775,017 | A * | 10/1988 | Forrest | E21B 4/02 175/103 |
| 6,523,623 | B1 | 2/2003 | Schuh | |
| 8,296,115 | B2 * | 10/2012 | Chen | E21B 7/04 175/24 |
| 2002/0177955 | A1 | 11/2002 | Jalali et al. | |
| 2003/0024738 | A1 * | 2/2003 | Schuh | E21B 7/04 175/45 |
| 2003/0132029 | A1 * | 7/2003 | Parker | B23K 26/0604 175/11 |
| 2004/0195003 | A1 * | 10/2004 | Batarseh | E21B 33/138 175/16 |
| 2005/0279532 | A1 * | 12/2005 | Ballantyne | E21B 47/12 175/40 |
| 2008/0179094 | A1 | 7/2008 | Repin et al. | |
| 2009/0090555 | A1 * | 4/2009 | Boone | E21B 44/02 175/45 |
| 2009/0205867 | A1 | 8/2009 | Reckmann et al. | |
| 2009/0319241 | A1 * | 12/2009 | Samuel | E21B 7/04 703/10 |
| 2011/0238220 | A1 * | 9/2011 | Seydoux | G01V 3/28 700/275 |
| 2012/0179445 | A1 | 7/2012 | Mitchell | |

OTHER PUBLICATIONS

Rasouli, Vamegh, and Brian Evans. "Design of an ultra-speed Lab-Scale drilling rig for simulation of high speed drilling operations in hard rocks." (2013). pp. 1-8.*

Pennewitz, E., et al. "Active cooling of downhole instrumentation for drilling in deep geothermal reservoirs." Instrumentation and Measurement Technology Conference (I2MTC), 2012 IEEE International. IEEE, 2012. pp. 1-4.*

Sy T Do, Fahim Forouzanfar, Albert C Reynolds, Estimation of Optimal Well Controls Using the Augmented Lagrangian Function with Approximate Derivatives, IFAC Proceedings Volumes, vol. 45, Issue 8, 2012, pp. 1-6.*

Carlsen, Liv A., Gerhard Nygaard, and Rune Time. "Utilizing instrumented stand pipe for monitoring drilling fluid dynamics for improving automated drilling operations." IFAC Proceedings vols. 45.8 (2012): pp. 217-222.*

Cayeux, Eric. "Safe mud pump management while conditioning mud: On the adverse effects of complex heat transfer and barite sag when establishing circulation." IFAC Proceedings vols. 45.8 (2012): pp. 231-238.*

International Search Report and Written Opinion for PCT/US2013/57498 dated May 26, 2014.

* cited by examiner

AUTOMATING DOWNHOLE DRILLING USING WELLBORE PROFILE ENERGY AND SHAPE

BACKGROUND

The present disclosure is related to downhole drilling and, more particularly, to automating downhole drilling based on the profile and energy of the wellbore being drilled.

The quality of a wellbore or borehole is generally related to the "smoothness" of the wellbore. Various trajectory models for drilling a wellbore have been proposed, with varying degrees of resulting wellbore smoothness. The simplest model, the tangential model, consists of straight line sections. Thus, the slope of this model is discontinuous at survey points along the length of the wellbore. Another common model is the minimum curvature model, which consists of circular arcs. This model has continuous slope, but discontinuous curvature. By far the most common method for trajectory modeling and drillstring analysis is the "torque-drag" model which calculates additional load during tripping in and tripping out operations where torque is due to rotation of the drillstring and drag is the excess load compared to rotating drillstring weight due to friction generated by drillstring contact with the wellbore.

The smoothness of the wellbore may be manifested in a number of ways, all adversely affecting the efficiency of the drilling process and increasing drilling and well completion costs. Presently, different parameters such as wellbore tortuosity, curvature, torsion, and various drilling indices are either used to quantify the wellbore path or estimate the difficulty of drilling a smooth wellbore. Furthermore, there is no clear criterion for defining the quality of the wellbore. For instance, drilling indices that are taken into account generally describe the quality of the borehole more subjectively rather than qualitatively quantifying the borehole. In some cases drilling indices are used purely as a measure of how difficult the well will be to drill, and not how smoothly it could be drilled.

Today, autonomous computer-controlled drilling operations (i.e., "drilling automation") are approaching reality because it promises to save rig time and deliver financial benefits to the well operator by automatically implementing a wellbore trajectory model. When the actual wellbore trajectory deviates from the planned wellbore path, it is imperative for a system to take corrective actions. For example, proportional-integral-derivative (PID) control used in wells today can provide negative feedback to the rotary steering drilling tools so as to bring the deviated drilling path back to the planned track. However, overshoots and undulations are quite often observed in PID control.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to downhole drilling and, more particularly, to automating downhole drilling based on the profile and energy of the wellbore being drilled.

Disclosed are systems and method of automating drilling operations based on the well profile energy so that a more smooth wellbore is drilled. The disclosed systems include a controller module that may be communicably coupled to a measurement system and a drilling system. The measurement system may update the controller module in real-time as to the location of an actual wellbore path as compared to a planned wellbore path. When the actual wellbore path has deviated from the planned wellbore path, the controller module may be configured to determine a return path based on minimum energy of the actual wellbore path and conveying one or more corrective command signals to the steering assembly in order to reorient a trajectory of the actual wellbore path such that it returns to the planned wellbore path. The return path is calculated using a trajectory model based on minimum wellbore energy criterion in order to minimize overshoots and undulations of well trajectories. As will be appreciated, an energy-based approach to returning the actual wellbore path to the planned wellbore path may be a reliable form of automating downhole drilling systems so that optimal utilization of the drilling equipment is achieved.

Figure 1:
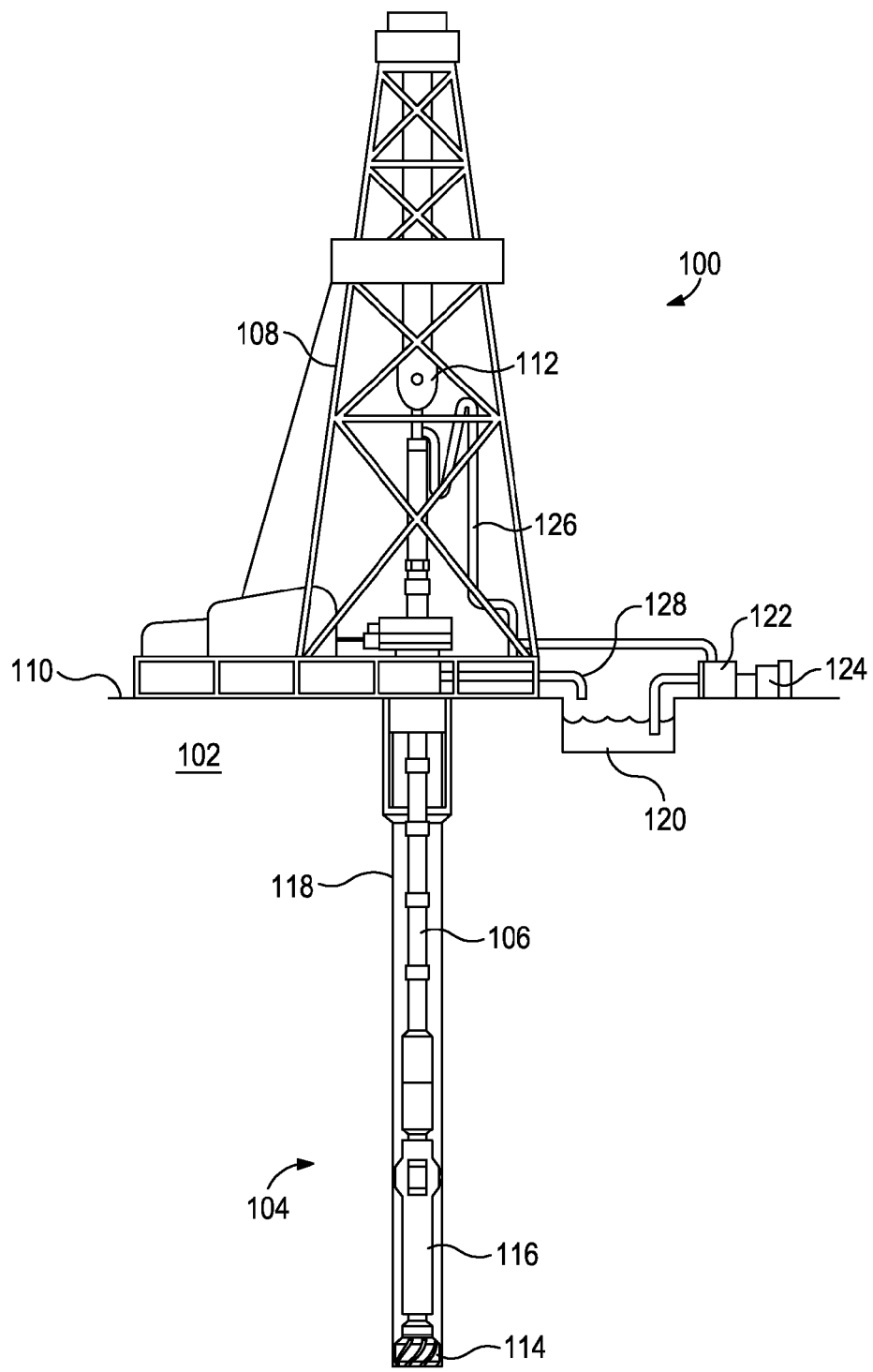
FIG. 1 illustrates an exemplary drilling system that may employ one or more principles of the present disclosure.

Referring to FIG. 1, illustrated is an exemplary drilling system 100 that may employ one or more principles of the present disclosure. Boreholes may be created by drilling into the earth 102 using the drilling system 100. The drilling system 100 may be configured to drive a bottom hole assembly (BHA) 104 positioned or otherwise arranged at the bottom of a drillstring 106 extended into the earth 102 from a derrick 108 arranged at the surface 110. The derrick 108 includes a kelly 112 used to lower and raise the drillstring 106.

The BHA 104 may include a drill bit 114 operatively coupled to a tool string 116 which may be moved axially within a drilled wellbore 118 as attached to the drillstring 106. During operation, the drill bit 114 penetrates the earth 102 and thereby creates the wellbore 118. The BHA 104 provides directional control of the drill bit 114 as it advances into the earth 102. The tool string 116 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within the tool string 116, as shown in FIG. 1.

Fluid or "mud" from a mud tank 120 may be pumped downhole using a mud pump 122 powered by an adjacent power source, such as a prime mover or motor 124. The mud may be pumped from the mud tank 120, through a stand pipe 126, which feeds the mud into the drillstring 106 and conveys the same to the drill bit 114. The mud exits one or more nozzles arranged in the drill bit 114 and in the process cools the drill bit 114. After exiting the drill bit 114, the mud circulates back to the surface 110 via the annulus defined between the wellbore 118 and the drillstring 106, and in the process returns drill cuttings and debris to the surface. The cuttings and mud mixture are passed through a flow line 128 and are processed such that a cleaned mud is returned down hole through the stand pipe 126 once again.

Although the drilling system 100 is shown and described with respect to a rotary drill system in FIG. 1, those skilled in the art will readily appreciate that many types of drilling systems can be employed in carrying out embodiments of the disclosure. For instance, drills and drill rigs used in embodiments of the disclosure may be used onshore (as depicted in FIG. 1) or offshore (not shown). Offshore oil rigs that may be used in accordance with embodiments of the disclosure include, for example, floaters, fixed platforms, gravity-based structures, drill ships, semi-submersible platforms, jack-up drilling rigs, tension-leg platforms, and the like. It will be appreciated that embodiments of the disclosure can be applied to rigs ranging anywhere from small in size and portable, to bulky and permanent.

Further, although described herein with respect to oil drilling, various embodiments of the disclosure may be used in many other applications. For example, disclosed methods can be used in drilling for mineral exploration, environmental investigation, natural gas extraction, underground installation, mining operations, water wells, geothermal wells, and the like. Further, embodiments of the disclosure may be used in weight-on-packers assemblies, in running liner hangers, in running completion strings, etc., without departing from the scope of the disclosure.

Figure 2:
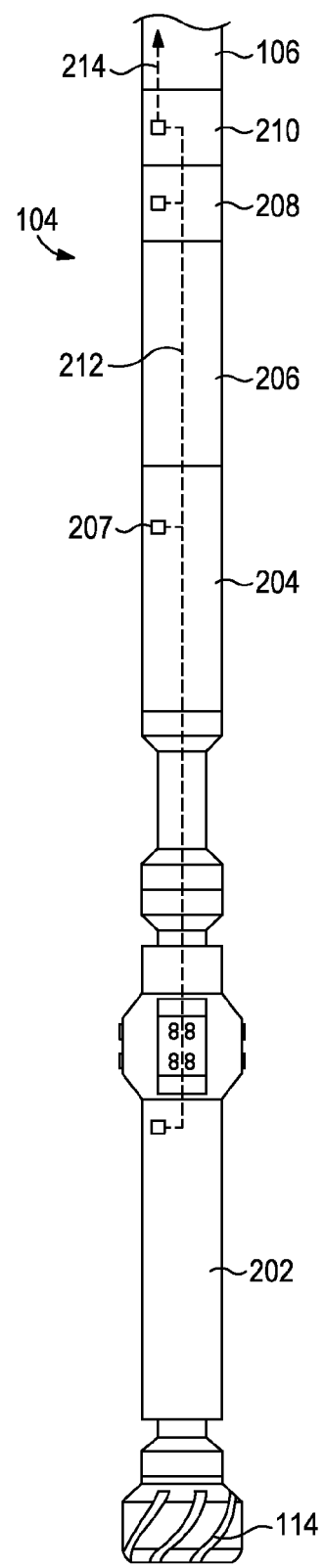
FIG. 2 illustrates an exemplary bottom hole assembly, according to one or more embodiments of the present disclosure.

Referring now to FIG. 2, with continued reference to FIG. 1, illustrated is an exemplary bottom hole assembly (BHA) 104 that can be used in accordance with one or more embodiments of the present disclosure. As illustrated, the BHA 104 may include at least the drill bit 114, a steering assembly 202 operatively coupled to the drill bit 114, an MWD/LWD tool 204, and a drill collar 206. The steering assembly 202 may be any type of downhole steering system or device configured to orient the drill bit 114 such that a planned trajectory or wellbore path is followed. In some embodiments, the steering assembly 202 may be a rotary steerable tool. In other embodiments, the steering assembly 202 may be a mud motor or any other known device or system that may reorient the trajectory of the drill bit 114, without departing from the scope of the disclosure.

The MWD/LWD tool 204 may include an MWD sensor package that may include one or more survey probes 207 configured to collect and transmit directional information, mechanical information, formation information, and the like. In particular, the one or more survey probes 207 may include one or more internal or external sensors such as, but not limited to, an inclinometer, one or more magnetometers, (i.e., compass units), one or more accelerometers, a shaft position sensor, combinations thereof, and the like. Directional information (i.e., wellbore trajectory in three-dimensional space) of the BHA 104 within the earth 102 (FIG. 1), such as inclination and azimuth, may be obtained in real-time using the survey probes 207.

The MWD/LWD tool 204 may further include an LWD sensor package that may include one or more sensors configured to measure formation parameters such as resistivity, porosity, sonic propagation velocity, or gamma ray transmissibility. In some embodiments, the MWD and LWD tools, and their related sensor packages, may be in communication with one another to share collected data therebetween. The MWD/LWD tool 204 can be battery driven or generator driven, as known in the art, and any measurements obtained from the MWD/LWD tool 204 can be processed either at the surface 110 (FIG. 1) or at a downhole location.

The drill collar 206 may be configured to add weight to the BHA 104 above the drill bit 114 so that there is sufficient weight on the drill bit 114 to drill through the requisite geological formations. Weight may also be applied to the drill bit 114 through the drillstring 106 as extended from the surface 110.

The BHA 104 may further include a sensor sub 208 coupled to or otherwise forming part of the BHA 104. The sensor sub 208 may be configured to monitor various operational parameters in the downhole environment with respect to the BHA 104. For instance, the sensor sub 208 may be configured to monitor operational parameters of the drill bit 114 such as, but not limited to, weight-on-bit (WOB), torque-on-bit (TOB), rotations per minute (RPM) of the drill bit 114, bending moment of the drillstring 106, vibration potentially affecting the drill bit 114, and the like. In some embodiments, the sensor sub 208 may be a DRILL-DOC® tool commercially-available from Sperry Drilling of Houston, Tex., USA. The DRILLDOC® tool, or another similar type of sensor sub 208, may be configured to provide real-time measurements of weight, torque and bending on an adjacent cutting tool (i.e., the drill bit 114) and/or drillstring 106 to characterize the transfer of energy from the surface to the cutting tool and/or drillstring 106. As will be appreciated, these measurements help optimize drilling parameters to maximize performance and minimize wasted energy transfer and vibration.

The BHA 104 may further include a controller module 210 coupled to or otherwise forming part of the BHA 104. The controller module 210 may be a downhole computer system communicably coupled to each of the sensor sub 208, the MWD/LWD tool 204 (e.g., its survey probe(s) 207), and the steering assembly 202 via one or more communication lines 212. Via the communication lines 212, the controller module 210 may be configured to send and receive data and commands to/from the sensor sub 208, the MWD/LWD tool 204, and the steering assembly 202 in real time.

In some embodiments, the controller module 210 may further be communicably coupled to the surface 110 (FIG. 1) via one or more communication lines 214 such that it is able to send and receive data in real time to/from the surface 110 (FIG. 1) during operation. The communication lines 212, 214 may be any type of wired telecommunications devices or means known to those skilled in the art such as, but not limited to, electric wires or lines, fiber optic lines, etc. Alternatively or additionally, the controller module 210 may include or otherwise be a telemetry module used to transmit measurements to the surface 110 wirelessly, if desired, using one or more downhole telemetry techniques including, but not limited to, mud pulse, acoustic, electromagnetic frequency, combinations thereof, and the like.

Figure 3:
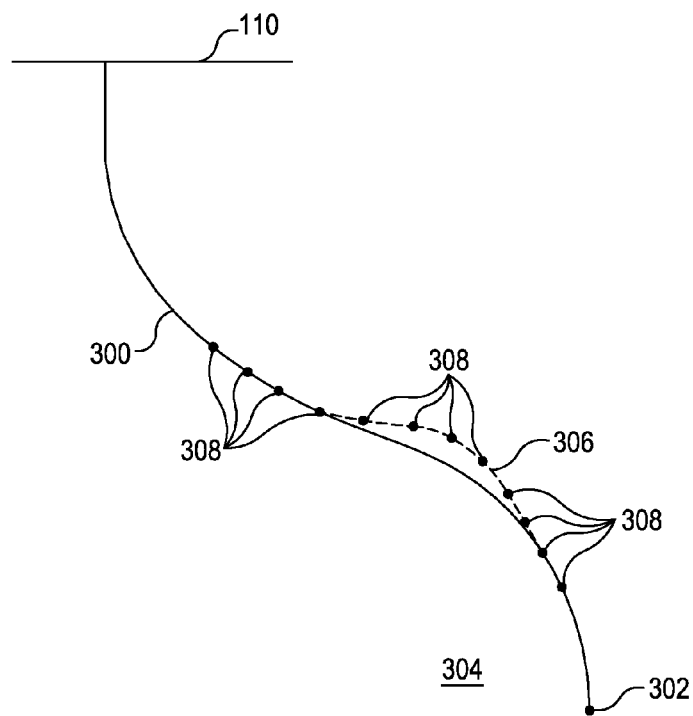
FIG. 3 depicts an exemplary wellbore path that may be formed by implementing the principles of the present disclosure, according to one or more embodiments.

Referring now to FIG. 3, with continued reference to FIGS. 1 and 2, illustrated is an exemplary wellbore path 300 that may be formed by implementing the principles of the present disclosure, according to one or more embodiments. More specifically, the wellbore path 300 represents a planned or designed path or trajectory for drilling a wellbore (e.g., the wellbore 118 of FIG. 1) in order to reach a target location 302 within a subterranean formation 304. The wellbore may be drilled using the BHA 104 and the drill string 106 described above with reference to FIGS. 1 and 2.

During exemplary drilling operations, the controller module 210 (FIG. 2) may be configured to continuously communicate with the steering assembly 202 (FIG. 2) such that the drill bit 114 is oriented to follow the planned wellbore path 300.

As is often the case, however, the tool string may deviate from the original designed wellbore path 300 and instead an actual wellbore path 306 may result that is misaligned with or otherwise diverges from the original wellbore path 300. Such deviations may result from several indirect variables such as, but not limited to, the rate of penetration of the tool string, the deflection of the tool string within varying rock types and/or formations, the toolface setting, rotation of the tool string (i.e., sliding or rotary, depending on the type of drilling motor), the weight on the drill bit 114, the flowrate of drilling fluids through and around the tool string, the wearing out of the drill bit 114 and other tools in the BHA 104, vibration in the drill string 106, combinations thereof, and the like.

As the tool string advances into the formation 304, the BHA 104 may be configured to take survey measurements at various points 308 along the actual wellbore path 306 in order to determine exactly where the tool string is located and whether the actual wellbore path 306 is following the designed wellbore path 300 within the formation 304. Survey measurements may be taken periodically as the tool string advances, such as at every 45 feet, at every 75 feet, at every 90 feet, or at any distance or frequency desired by the well operator. Such survey measurements may inform a well operator (or an automated system such as the controller module 210 of FIG. 2) in real-time as to whether directional changes are needed in order to reorient the trajectory of the actual wellbore path 306 and thereby bring it back into alignment with the designed wellbore path 300.

While there may be several methods of redirecting the tool string such that the actual wellbore path 306 is able to return and follow the designed wellbore path 300, the present disclosure provides a trajectory control model that does so based on minimum wellbore energy criterion in order to minimize overshoots and undulations of well trajectories. Process parameters that are taken into consideration include the length between survey stations 308, the inclination change rate between survey stations 308, and the azimuth change rate between survey stations 308. At least one of the balanced tangential method, the minimum curvature method, and the natural curve method may be used to calculate these parameters. By applying minimum wellbore energy conditions, a unique solution of these parameters may be obtained, thereby resulting in optimal utilization of the tool string equipment and a smoother wellbore.

It may further prove advantageous to automate such operations such that well operator intervention from the surface is generally unnecessary. Rather, a downhole computer system, such as the controller module 210 (FIG. 2) may autonomously redirect the downhole trajectories automatically based on updated survey measurements. In other words, according to the present disclosure, the controller module 210 may be provided with real-time updates of where the tool string is located with respect to the planned wellbore path 300 and, when needed, may be configured to determine a return path that exhibits minimum incremental wellbore energy.

In order to achieve a minimum energy return to the designed wellbore path 300, the curvature and the torsion of the actual wellbore path 306 returning to the designed wellbore path 300 must be minimized. Energy-based mathematical criterion used to quantify the complexity of a wellbore path design typically uses the physical reasoning rather than the geometric meaning of a wellbore path. The non-linear curve modeling of a thin elastic beam, for example, is known as the minimum energy curve and is characterized by bending the least while passing through a given set of points. It is considered to be excellent criterion considering the simplicity for producing smooth curves. Hence, this criterion may be used to describe the minimum energy of the actual wellbore path 306 returning to the designed wellbore path 300. An added advantage is that it may be used to emphasize the undulation of the wellbore path curvature of sharp wellbore path designs obtained using conventional methods.

The strain energy (Es) of a wellbore path (e.g., the actual wellbore path 306 returning to the designed wellbore path 300) is given as the arc length integral of the curvature (κ) squared:

$$E_s = \int_0^\ell \kappa(x)^2 dx \qquad \text{Equation (1)}$$

The curvature of the wellbore path may be given as:

$$\kappa = \left|\frac{dt}{ds}\right| \qquad \text{Equation (2)}$$
$$= |\dot{t}|$$
$$= \left|\frac{x^2 r(s)}{xs^2}\right|$$

where x is the course length distance between survey stations or points 308 (FIG. 1), s is the arc length of x, and r(s) is the radius of the arc length s. The curvature κ is also indicative of the tangent vector |ṫ| of the wellbore path. Alternatively, the curvature of the wellbore path may also be given as:

$$\kappa = \frac{d\alpha}{ds} \qquad \text{Equation (3)}$$

where α is the inclination of the wellbore path as obtained from at least two real-time measurements obtained in the BHA at corresponding survey stations 308 (FIG. 3). Using the curvature of the wellbore path, the torsion of the wellbore path may also be determined as follows:

$$\tau = \frac{\kappa_\alpha k_\phi - \kappa_\phi k_\alpha}{\kappa^2}\sin\alpha + \kappa_\phi\left(1 + \frac{\kappa_\alpha^2}{\kappa^2}\right)\cos\alpha \qquad \text{Equation (4)}$$

where φ is the azimuth of the wellbore path as obtained from at least two real-time measurements obtained in the BHA at corresponding survey stations 308 (FIG. 3). Both calculations for curvature and torsion depend on the inclination (α), azimuth (φ), and course length (d) (i.e., the distance between the survey stations 308).

With the inclusion of the torsion (τ) parameter as the arc length integral of the torsion (τ) squared, the minimum energy equation (1) becomes more comprehensive for the wellbore path design configured to return the actual wellbore path 306 to the designed wellbore path 300. This equation can be given as:

$$E_s = \int_0^\ell (\kappa(x)^2 + \tau(x)^2) dx \quad \text{Equation (5)}$$

Equation (5) can be further normalized to a standard wellbore course length between survey stations or points 308 (FIG. 3) and can be given as:

$$E_{(abs)_n} = \left( \frac{\sum_{i=1}^{n} (\kappa_i^2 + \tau_i^2) \Delta x_i}{x_n + \Delta x_n} \right) \quad \text{Equation (6)}$$

Accordingly, the minimum energy equations transform differential changes in the curvature, torsion, and strain energy of the return path (i.e., the actual wellbore path 306 returning to the designed wellbore path 300) into calculated values. Such calculated values may be determined using a computer system, such as the controller module 210 of FIG. 2.

Figure 4:
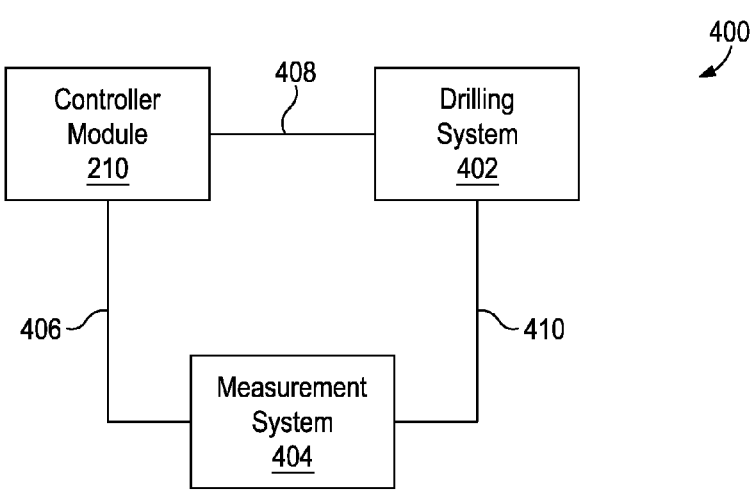
FIG. 4 illustrates a simplified schematic diagram of a system that is configured to execute the methods described herein, according to one or more embodiments.

Referring now to FIG. 4, with continued reference to FIGS. 1-3, illustrated is a simplified schematic diagram of a system 400 that may be configured to execute the methods described herein, according to one or more embodiments. As illustrated, the system 400 may include the controller module 210, as generally described above with reference to FIG. 2, communicably coupled to a drilling system 402 and a measurement system 404. The measurement system 404 may include, for example, the MWD/LWD tool 204 and the sensor sub 208 of FIG. 2 in order to collect and transmit directional information, mechanical information, formation information, and the like. Updated directional information of the BHA 104 (FIG. 2), such as course length, inclination and azimuth, may be obtained and transmitted in real-time to the controller module 202 in the form of one or more measurement signals 406.

The controller module 202 may include a processing unit that may be configured to receive and process the measurement signals 406. In some embodiments, the processing unit may be a proportional-integral-derivative (PID) controller module or system. The processing unit may be further configured to compare the measurement signals 406 with stored path data corresponding to the planned wellbore path 300 (FIG. 3). If the measurement signals 406, as processed in the controller module 202, indicate that the actual wellbore path 306 (FIG. 3) has deviated from the planned wellbore path 300, the controller module 202 may be configured to employ the minimum energy equations described above and calculate a return path for the actual wellbore path 306 that results in minimum incremental wellbore energy.

Using the results derived from the minimum energy equations, the controller module 202 may be configured to generate and send one or more corrective command signals 408 to the drilling system 402 in order to reorient the trajectory of the actual wellbore path 306 such that it rejoins the planned wellbore path 300. The drilling system 402 may include the steering assembly 202 (FIG. 2) and the drill bit 114 (FIG. 2), for example. Upon receiving the corrective command signals 408, the steering assembly 202 may adjust one or more drilling parameters in order to redirect the drill bit 114 toward the planned wellbore path 300. Exemplary drilling parameters include, but are not limited to, weight on bit, drilling fluid flow through the drill string 106 (FIG. 2), the drill string 106 rotational speed, the density and viscosity of the drilling fluid, the azimuth and inclination of the BHA 104, toolface direction, bent angle, combinations thereof, and the like.

As drilling progresses and advances within the subterranean formation 304 (FIG. 3), the measurement system 404 may be configured to continually take or otherwise obtain survey measurements 410 corresponding to the real-time conditions of the drilling operation. In some embodiments, the survey measurements 410 may be taken at the survey points 308 (FIG. 3), but may equally be taken at any time during the drilling operation, without departing from the scope of the disclosure. Accordingly, as the drilling operation progresses, the controller module 202 is continually updated with real-time measurement data 406 corresponding to directional information (i.e., real-time inclination and azimuth angles) of the BHA 104 (FIG. 2) and can then issue corrective command signals 408 configured to maintain the actual wellbore path 306 in-line with the planned wellbore path 300. Moreover, since the minimum energy equations are used in generating the corrective command signals 408, a smoother wellbore profile results that reduces overall drag and friction.

Based on the calculations performed in the controller module 210, the wellbore path energy as well as its shape can be estimated. For example, the measurement system 404 automatically senses between two survey stations (e.g., stations 308 of FIG. 3), thereby allowing the controller module 210 to classify the wellbore path so that downhole automation can be automatically adjusted via the drilling system 402. When a particular mathematical condition is satisfied, the controller module 210 may determine or otherwise conclude what the shape of the wellbore path is and thereby generate a corrective command signal 408 designed to correct the wellbore trajectory.

For instance, when no curvature ($\kappa$) is sensed or otherwise determined between two survey points, the well path may be in what is known as a "holding" mode. The controller module 210 may classify the current wellbore path as essentially straight and confirm that minimum energy is being expended between those two survey points. For wellbore paths in a two-dimensional (2D) plane, when the torsion ($\tau$) sensed in the BHA 104 is substantially equal to zero, then the mathematical condition indicating that the wellbore path is a 2D path is satisfied if the wellbore path is a plane curve. In other words, energy is contributed only due to curvature ($\kappa$) in such wellbore paths and the wellbore path may be classified as a plane curve. Similarly, when the curvature ($\kappa$) of the wellbore path is constant but greater or less than zero (e.g., either building or dropping), and torsion ($\tau$) is substantially equal to zero, then the condition indicating that the wellbore path is a 2D path is satisfied if the wellbore path is part of a circle. In other words, energy is contributed only due to curvature ($\kappa$) but otherwise remains constant.

For wellbore paths in three-dimensional (3D) space, the mathematical condition indicating that the wellbore path is a 3D path is satisfied when the curvature ($\kappa$) is constant but greater than zero, and the torsion ($\tau$) is constant but greater than zero, if the wellbore path is part of a circular helix or $\tau/\kappa$ is constant. In such cases, energy is contributed due to both curvature ($\kappa$) and torsion ($\tau$) but remains constant. Similarly, when $\tau/\kappa$ torsion is greater or less than zero, then the mathematical condition indicating that the wellbore path is a 3D path is satisfied and the wellbore path may be classified as a spiral radial path that progressively increases.

For 3D wellbore paths, in some embodiments, the controller module 210 may further be configured to calculate or determine the rotation index (I) for the wellbore path. The rotation index is a geometric quantity that estimates the number of loops in a curve and positive looping if the normal is oriented inward (i.e., the curve progresses counter-clockwise). Calculating the rotation index is another way to define the characteristic of a space curve between the two survey stations, and can be used to help define or otherwise describe the wellbore path trajectory. The rotation index may be determined from the following equation:

$$I = \frac{1}{2\pi} \int_a^b \kappa(s)ds \qquad \text{Equation (7)}$$

where $$\int_a^b \kappa(s)ds$$

corresponds to the total curvature, which is $2\pi$ multiplied by the rotation index of the curve. For example, the rotation index of a plane curve, such as a circle or curves obtained by deforming a circle, will always be one. More generally, for a space curve using the total curvature, it can be given as:

$$I = \frac{1}{2\pi} \int_a^b \left(\sqrt{\kappa(s)^2 + \tau(s)^2}\right)ds \qquad \text{Equation (8)}$$

Using Equation (5) above, it can be seen that:

$$I = \frac{1}{2\pi} E_s \qquad \text{Equation (9)}$$

That is, more rotation or spiraling within the current wellpath equates to more energy of the wellpath profile or more energy needed to drill to return to the planned wellbore path 300. Calculation of the rotation index by the controller module 210 may prove useful in determining a new inclination, azimuth, and strain energy based on the rotation of the tool string between the two survey stations. This will also provide an estimate as to how the wellpath is spiraling based on the energy increase.

Accordingly, the controller module 210 may determine or otherwise conclude what the shape of the wellbore path is between survey stations based on the measurements obtained from the measurement system 404 and the internal calculations. Knowing the wellbore path shape may prove useful in allowing the controller module 210 to automatically generate corrective command signals 408 designed to correct the wellbore trajectory, thereby automating subsequent adjustments to the drilling system 402 in real-time.

Figure 5:
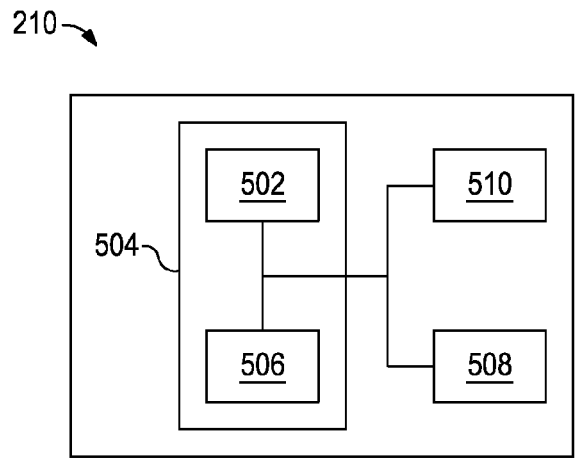
FIG. 5 is a simplified schematic diagram of a controller module, according to one or more embodiments.
Figure 6:
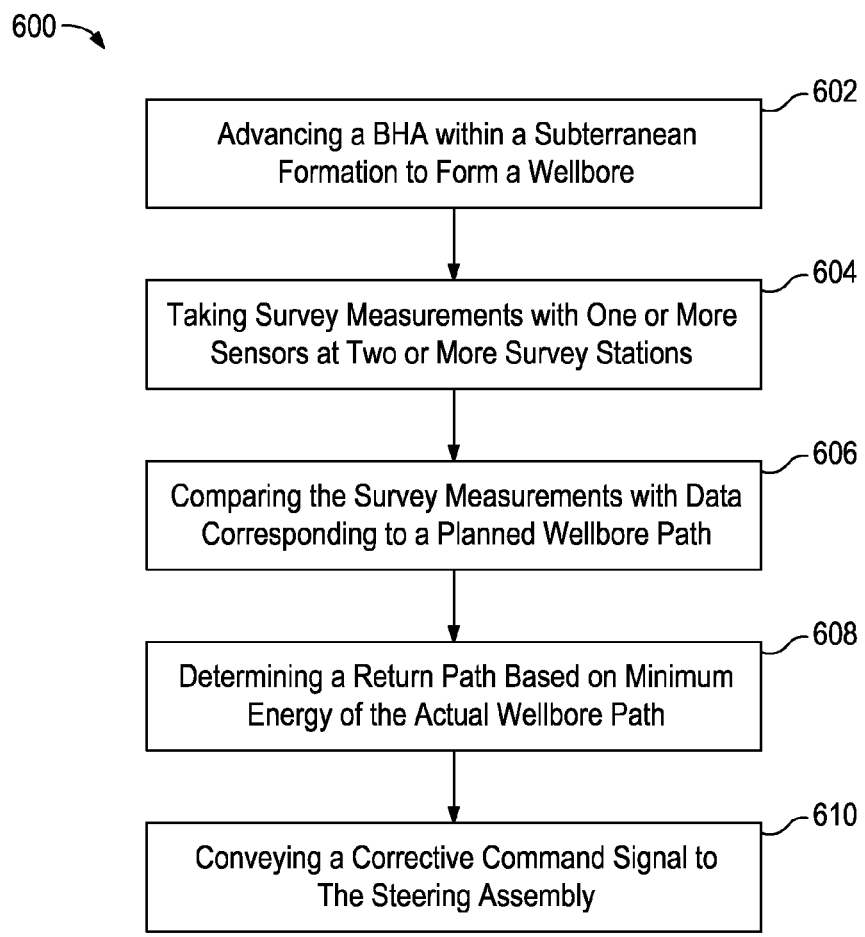
FIG. 6 is a schematic flowchart of a method of automating drilling operations, according to one or more embodiments.

Referring now to FIG. 5, with continued reference to FIG. 4, illustrated is a schematic diagram of the controller module 210, according to one or more embodiments. The present disclosure may be implemented through a computer-executable program of instructions, such as program modules, generally referred to as software applications or application programs executed by a computer, such as the controller module 210. The software may include, for example, routines, programs, objects, components, and data structures that perform particular tasks or implement particular abstract data types. The software forms an interface to allow the controller module 210 to react according to a source of input.

An application program 502 may be used as an interface application to implement the methods disclosed herein. In some embodiments, the application program may be WELLPLAN™, a commercially-available software application marketed by Landmark Graphics Corporation. The software may also cooperate with other code segments to initiate a variety of tasks in response to data received in conjunction with the source of the received data. The application program 502 may be stored on a memory 504. The memory 504 primarily stores the application program 502, which may also be described as a program module containing non-transitory computer-executable instructions, executed by the controller module 210 for implementing the methods disclosed herein. The memory 504, therefore, may further include a wellbore trajectory module 506, which encompasses data corresponding to the planned wellbore path 300 (FIG. 3) and which may be able to operate in conjunction with the application program 502 (i.e., WELLPLAN™).

Although the controller module 210 is shown as having a generalized memory 504, the controller module 210 may include a variety of computer readable media. By way of example, and not limitation, computer-readable media may comprise computer storage media and communication media. The memory 504 may include computer storage media in the form of volatile and/or nonvolatile memory such as a read only memory (ROM) and random access memory (RAM). A basic input/output system (BIOS), containing the basic routines that help to transfer information between elements within the controller module 210, such as during start-up, is typically stored in ROM. The RAM typically contains data and/or program modules that are immediately accessible to and/or presently being operated on by a processing unit 508.

The components shown in the memory 504 may also be included in other removable/nonremovable, volatile/nonvolatile computer storage media. For example only, a hard disk drive may read from or write to nonremovable, nonvolatile magnetic media, a magnetic disk drive may read from or write to a removable non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the controller module 210.

A well operator may enter commands and information into the controller module 210 through a client interface 510, which may include one or more input devices such as a keyboard and pointing device, commonly referred to as a mouse, trackball or touch pad. Input devices may also include a microphone, joystick, satellite dish, scanner, or the like. These and other input devices may also be connected to the processing unit 508 through the client interface 510 and via a system bus (not shown), but may be connected by other interface and bus structures, such as a parallel port or a universal serial bus (USB). A monitor or other type of display device may be connected to the system bus via an interface, such as a video interface. In addition to the monitor, computers may also include other peripheral output devices such as speakers and printer, which may be connected through an output peripheral interface.

Although many other internal components of the controller module 210 are not shown, those of ordinary skill in the art will appreciate that such components and their interconnection are well known. Moreover, those skilled in the art will appreciate that the methods of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may, therefore, be implemented in connection with various hardware, software or a combination thereof, in a computer system or other processing system.

Referring now to FIG. 7, illustrated is a flow chart for a method 700 of automating drilling operations, according to one or more embodiments described herein. The method 700 may include advancing a bottom hole assembly (BHA) within a subterranean formation to form a wellbore, as at 702. The wellbore may be formed along an actual wellbore path, but may be following a planned wellbore path. The BHA may include a controller module, one or more sensors, and a steering assembly. Survey measurements may be taken with the one or more sensors at two or more survey stations along the actual wellbore path, as at 704.

The method 700 may further include comparing the survey measurements with data corresponding to a planned wellbore path, as at 706. Such a comparison may be done and otherwise processed within the controller module. A return path may then be determined as based on minimum energy of the actual wellbore path, as at 708. This may be determined when the actual wellbore path has deviated from the planned wellbore path and corrective actions may then be required. Accordingly, a corrective command signal may be conveyed to the steering assembly in order to reorient the actual wellbore path, as at 710. In other words, the controller module may be configured to calculate and convey the corrective command signal to the steering assembly in order to change the trajectory of the actual wellbore path such that it returns to the planned wellbore path.

Embodiments disclosed herein include:

A. A method that includes advancing a bottom hole assembly (BHA) within a subterranean formation and thereby forming a wellbore along an actual wellbore path, the BHA including a controller module, one or more sensors, and a steering assembly, taking survey measurements with the one or more sensors at two or more survey stations along the actual wellbore path, comparing the survey measurements with data corresponding to a planned wellbore path with the controller module, determining with the controller module a return path based on minimum energy of the actual wellbore path when the actual wellbore path has deviated from the planned wellbore path, and conveying a corrective command signal to the steering assembly with the controller module in order to reorient a trajectory of the actual wellbore path such that it returns to the planned wellbore path.

B. A system for drilling a wellbore. The system may include a measurement system configured to obtain survey measurements at two or more survey stations along an actual wellbore path, a controller module communicably coupled to the measurement system and configured to compare the survey measurements with data corresponding to a planned wellbore path and, when the actual wellbore path has deviated from the planned wellbore path, determine a return path based on minimum energy of the actual wellbore path, and a drilling system communicably coupled to the controller module, the drilling system being configured to receive one or more corrective command signals from the controller module and reorient a trajectory of the actual wellbore path such that it returns to the planned wellbore path.

C. A non-transitory computer readable medium including computer-readable instructions stored thereon which, when executed by a processor, configure the processor to perform functions including taking survey measurements with one or more sensors arranged in a bottom hole assembly (BHA) at two or more survey stations along a wellbore being drilled by the BHA, the BHA being advanced into a subterranean formation and thereby forming an actual wellbore path, comparing the survey measurements with data corresponding to a planned wellbore path with a controller module arranged in the BHA, determining with the controller module a return path based on minimum energy of the actual wellbore path when the actual wellbore path deviates from the planned wellbore path, and conveying a corrective command signal to a steering assembly of the BHA with the controller module in order to reorient a trajectory of the actual wellbore path such that it returns to the planned wellbore path.

Each of embodiments A, B, and C may have one or more of the following additional elements in any combination: Element 1: further comprising automating the taking of the survey measurements, the determination of the return path, and reorientation of the actual wellbore path such that the BHA returns to the planned wellbore path autonomously. Element 2: wherein determining with the controller module the return path comprises minimizing a curvature and a torsion of the actual wellbore path as returning to the planned wellbore path. Element 3: The method of claim 1, further comprising adjusting one or more drilling parameters with the steering assembly in response to the corrective command signals. Element 4: wherein taking the survey measurements with the one or more sensors includes measuring real-time conditions of the actual wellbore path, and conveying the survey measurements to the controller module in real-time. Element 5: further comprising maintaining the actual wellbore path along the planned wellbore path by autonomously conveying the corrective command signals to the steering assembly in real-time. Element 6: further comprising determining a shape of the actual wellbore path with the controller module. Element 7: further comprising generating the corrective command signal based at least in part on the shape of the actual wellbore path. Element 8: further comprising calculating a rotation index for the actual wellbore path with the controller module.

Element 9: wherein the measurement system includes at least one of a measure-while-drilling tool and a loggingwhile-drilling tool. Element 10: wherein the measure-while-drilling tool is configured to measure and obtain directional information for a bottom hole assembly, the directional information including angles of inclination and azimuth of the bottom hole assembly. Element 11: wherein the drilling system includes a rotary steerable tool and at least one drill bit operatively coupled thereto. Element 12: wherein the rotary steerable tool receives the one or more corrective command signals from the controller module and adjusts one or more drilling parameters in order to reorient the trajectory of at least one drill bit such that the actual wellbore path returns to the planned wellbore path. Element 13: wherein the one or more drilling parameters are at least one of weight on bit, drilling fluid flow through a drill string, rotational speed of the drill string, a density and viscosity of the drilling fluid, and azimuth and inclination of a bottom hole assembly. Element 14: wherein the controller module includes a processing unit configured to minimize a curvature and a torsion of the actual wellbore path returning to the planned wellbore.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method, comprising:
    advancing a bottom hole assembly (BHA) within a subterranean formation and thereby forming a wellbore along an actual wellbore path, the BHA including a controller module, one or more sensors, and a steering assembly;
    taking survey measurements with the one or more sensors at two or more survey stations along the actual wellbore path;
    comparing the survey measurements with data corresponding to a planned wellbore path with the controller module;
    determining with the controller module a return path based on minimum energy of the actual wellbore path when the actual wellbore path has deviated from the planned wellbore path, wherein determining the return path comprises determining an inclination change rate between each survey station, an azimuth change rate between each survey station, and a course length between each survey station and thereby minimizing a curvature and a torsion of the actual wellbore path as returning to the planned wellbore path; and
    conveying a corrective command signal to the steering assembly with the controller module to reorient a trajectory of the actual wellbore path toward the planned wellbore path.

2. The method of claim 1, further comprising automating the taking of the survey measurements, the determination of the return path, and reorientation of the actual wellbore path to return the BHA to the planned wellbore path autonomously.

3. The method of claim 1, further comprising adjusting one or more drilling parameters with the steering assembly in response to the corrective command signals.

4. The method of claim 1, wherein taking the survey measurements with the one or more sensors comprises:
    measuring real-time conditions of the actual wellbore path; and
    conveying the survey measurements to the controller module in real-time.

5. The method of claim 4, further comprising maintaining the actual wellbore path along the planned wellbore path by autonomously conveying the corrective command signals to the steering assembly in real-time.

6. The method of claim 1, further comprising determining a shape of the actual wellbore path with the controller module.

7. The method of claim 6, further comprising generating the corrective command signal based at least in part on the shape of the actual wellbore path.

8. The method of claim 1, further comprising calculating a rotation index for the actual wellbore path with the controller module.

9. A system for drilling a wellbore, comprising:
    a measurement system configured to obtain survey measurements at two or more survey stations along an actual wellbore path;
    a controller module communicably coupled to the measurement system and configured to compare the survey measurements with data corresponding to a planned wellbore path and, when the actual wellbore path has deviated from the planned wellbore path, determine a return path based on minimum energy of the actual wellbore path, wherein determination of the return path comprises a determination of an inclination change rate between each survey station, an azimuth change rate between each survey station, and a course length between each survey station and thereby a minimization of curvature and torsion of the actual wellbore path returning to the planned wellbore path; and
    a drilling system communicably coupled to the controller module and configured to receive one or more corrective command signals from the controller module to reorient a trajectory of the actual wellbore path toward the planned wellbore path.

10. The system of claim 9, wherein the measurement system includes at least one of a measure-while-drilling tool and a logging-while-drilling tool.

11. The system of claim 10, wherein the measure-while-drilling tool is configured to measure and obtain directional information for a bottom hole assembly, the directional information including angles of inclination and azimuth of the bottom hole assembly.

12. The system of claim 9, wherein the drilling system includes a rotary steerable tool and at least one drill bit operatively coupled thereto.

13. The system of claim 12, wherein the rotary steerable tool receives the one or more corrective command signals from the controller module and adjusts one or more drilling parameters to reorient the trajectory of a drill bit toward the planned wellbore path.

14. The system of claim 13, wherein the one or more drilling parameters are at least one of weight on bit, drilling fluid flow through a drill string, rotational speed of the drill string, a density and viscosity of the drilling fluid, and azimuth and inclination of a bottom hole assembly.

15. A non-transitory computer readable medium including computer-readable instructions stored thereon which, when executed by a processor, configure the processor to perform functions including:

taking survey measurements with one or more sensors arranged in a bottom hole assembly (BHA) at two or more survey stations along a wellbore being drilled by the BHA, the BHA being advanced into a subterranean formation and thereby forming an actual wellbore path;

comparing the survey measurements with data corresponding to a planned wellbore path with a controller module arranged in the BHA;

determining with the controller module a return path based on minimum energy of the actual wellbore path when the actual wellbore path deviates from the planned wellbore path, wherein determining the return path comprises determining an inclination change rate between each survey station, an azimuth change rate between each survey station, and a course length between each survey station and thereby minimizing a curvature and a torsion of the actual wellbore path as returning to the planned wellbore path; and conveying a corrective command signal to a steering assembly of the BHA with the controller module to reorient a trajectory of the actual wellbore path toward the planned wellbore path.

16. The non-transitory computer readable medium of claim 15, further comprising adjusting one or more drilling parameters with the steering assembly in response to the corrective command signals.

17. The non-transitory computer readable medium of claim 15, further comprising:

determining a shape of the actual wellbore path with the controller module; and generating the corrective command signal based at least in part on the shape of the actual wellbore path.

18. The non-transitory computer readable medium of claim 15, further comprising calculating a rotation index for the actual wellbore path with the controller module.

* * * * *